(12) United States Patent
Thomas

(10) Patent No.: US 6,517,119 B2
(45) Date of Patent: Feb. 11, 2003

(54) HOSE COUPLING WITH RETAINER RING

(75) Inventor: Paul Bruce Thomas, San Pedro, CA (US)

(73) Assignee: Carrand Companies, Inc., Compton, CA (US)

(*) Notice: Subject to any disclaimer, the term of this patent is extended or adjusted under 35 U.S.C. 154(b) by 0 days.

(21) Appl. No.: 09/815,575

(22) Filed: Mar. 26, 2001

(65) Prior Publication Data

US 2002/0135181 A1 Sep. 26, 2002

(51) Int. Cl.[7] .................................................. F16L 27/00
(52) U.S. Cl. ........................ 285/276; 285/278; 285/280; 285/281; 285/321
(58) Field of Search ................................ 285/184, 276, 285/278, 280, 281, 321

(56) References Cited

U.S. PATENT DOCUMENTS

| | | |
|---|---|---|
| 2,084,431 A | 6/1937 | Catley |
| 2,253,018 A | 8/1941 | Cowles |
| 2,440,452 A | 4/1948 | Smith |
| 3,517,952 A | 6/1970 | McCracken |
| 3,773,360 A | 11/1973 | Timbers |
| 3,799,589 A * | 3/1974 | Boelkins .................... 285/281 |
| 3,813,065 A | 5/1974 | Hallsey et al. |
| 3,847,393 A | 11/1974 | Busselmeier |
| 4,105,226 A | 8/1978 | Frey et al. |
| 4,111,464 A | 9/1978 | Asano et al. |
| 4,565,392 A * | 1/1986 | Vyse .......................... 285/321 |
| 4,615,547 A * | 10/1986 | Sutcliffe et al. ............ 285/276 |
| 4,889,368 A | 12/1989 | Laipply |
| 5,022,687 A | 6/1991 | Ariga |
| 5,064,226 A * | 11/1991 | Klas .......................... 285/184 |
| 5,197,768 A | 3/1993 | Conner |
| 5,419,594 A | 5/1995 | Nelms |
| 5,586,791 A | 12/1996 | Kirchner et al. |
| 5,707,085 A | 1/1998 | Kubiak |
| 5,845,944 A * | 12/1998 | Enger et al. ................ 285/276 |

FOREIGN PATENT DOCUMENTS

GB          2239503 A   *   7/1991

* cited by examiner

Primary Examiner—Lynne H. Browne
Assistant Examiner—Aaron Dunwoody
(74) Attorney, Agent, or Firm—George R. McGuire; Hancock & Estabrook, LLP

(57) ABSTRACT

A retainer ring connector comprised of a ring situated between matching spokes on both the male and female members of a hose coupling. The ring is contained behind the outwardly extending spokes on the male member. When the male member is inserted into the female member, spokes on the inside of the female member pass between the spokes of the male member and are forced over the ring element which compresses sufficiently to allow the spokes to pass. After the spokes of the female member pass over the compressed ring member, the ring member expands and prevents the male and female members from disengaging and backing away from each other. The spoked retainer ring connector allows for complete rotational movement with preventing the male and female members from separating.

2 Claims, 4 Drawing Sheets

(3X)

(2X)

(3X)

(2X)

(3X)

(3X)

(3X)

(3X)

HOSE COUPLING WITH RETAINER RING

BACKGROUND OF THE INVENTION

1. Field of Invention

The present invention relates generally to hose couplings, and more particularly to hose couplings with retainer ring connectors that allow for complete rotation and secure connection of the coupling's parts.

2. Description of Prior Art

Hose couplings having a male element connected to a first hose and a female element connected to a second hose are well known in the art (such coupling could also be used, for instance, to interconnect a hose to a sprinkler, spray valve, or other device that requires rotation relative to a hose. These couplings will generically be referred to herein as "couplings" or "hose couplings"). Typically, such couplings use some form of spoked system to form the locking mechanism between the male and female elements. These devices, however, do not allow full rotation through an entire three hundred and sixty degree range as the rotation of the male and female members will eventually align the spokes and allow disengagement. Without complete rotation, the hoses to which the male and female elements are connected become twisted or kinked, thereby resulting in diminished fluid transfer, hose cracking, and even injury to the user if ensnared by the hose.

Some couplings in the art use slides or additional locking parts to rotationally or securely engage the male and female elements. Due to the need for additional parts or sophisticated designs, these devices require expensive molding techniques and thus lead to increased manufacturing costs. These devices are also complicated to put together and require additional effort and time to engage. Furthermore, these slides or additional locking parts may be accidentally activated through the use of the hoses, thereby causing the male and female elements to disengage and allowing fluids to escape from the coupling.

Other prior art couplings use rings or similar elements which frictionally connect the male and female members by expanding or contracting. However, these devices result in burdensome or limited rotational movement as the frictional connection inhibits free movement due to the frictional forces placed on the male and female members by the expanding or contracting ring or similar element. These devices also fail to provide for secure retention of the members because the rings or similar elements may lose their flexibility and resiliency over time, thus reducing the frictional forces and eventually allowing the male and female members to separate.

3. Objects and Advantages

It is a principal object and advantage of the present invention to provide a hose coupling capable of rotation through a full three-hundred and sixty degrees.

It is an additional object and advantage of the present invention to provide a hose coupling that is secure and will not readily separate.

It is a further object and advantage of the present invention to provide a hose coupling that is simple to manufacture and can be implemented with a minimum amount of effort and expense.

Other objects and advantages of the present invention will in part be obvious, and in part appear hereinafter.

SUMMARY OF THE INVENTION

In accordance with the foregoing objects and advantages, the present invention provides a hose coupling comprising a male member and a female member rotationally engaged with one another, and a retainer ring connector positioned between the corresponding spokes formed on the male and female elements which permits rotational movement between the members and provides a secure connection.

The retainer ring is positioned rearwardly of the outwardly extending spokes on the male member and forward of the inwardly extending spokes of the female member. When the male member is axially inserted into the female member, the spokes on the inside of the female member pass between the outwardly extending spokes of the male member and are forced over the ring element which resiliently compresses a sufficient amount to permit passage of the spokes. After the spokes of the female member pass over the compressed ring element, the resiliency of the ring member expands causes it to outwardly, thereby preventing the male and female members from disengaging from each other. This retainer ring connector further permits for complete rotational movement between the male and female members by maintaining axial separation of the respective spokes.

DETAILED DESCRIPTION

Figure 1:
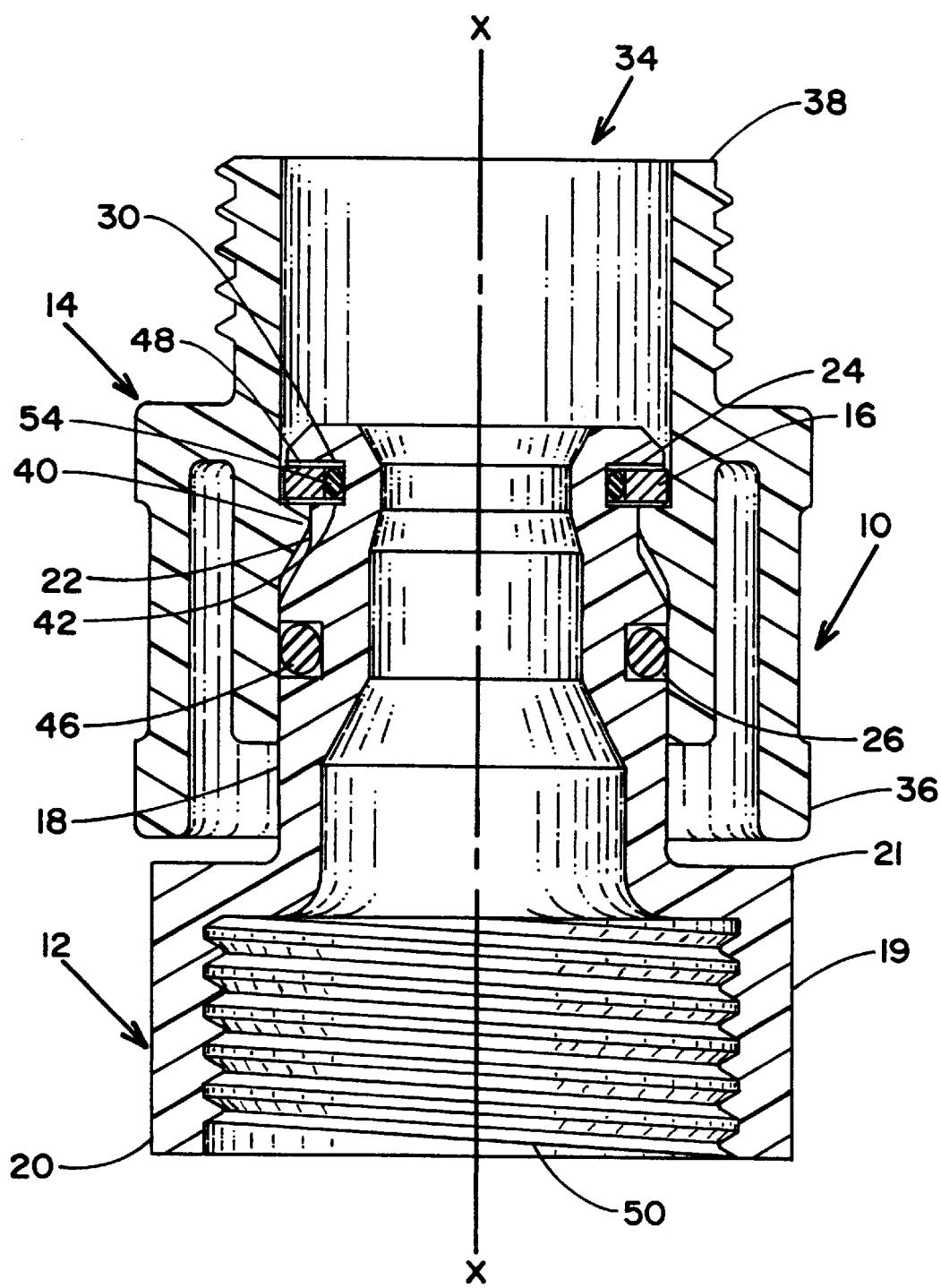
FIG. 1 is a longitudinal cross-sectional view of the hose coupling of the present invention.

Referring now to the drawing figures, wherein like reference numerals refer to like parts throughout, there is seen in FIG. 1 a hose coupling, denoted generally by reference numeral 10, that extends along a longitudinal axis X—X and generally comprises a male element 12, a female element 14 engaged therewith, and a retainer ring 16 positioned interiorly of male element 12 and female element 14. Coupling 10 is intended to be used in a cleaning system utilizing hoses and other water transport devices, such as a car wash. As will be described in greater detail hereinafter, the presence and structure of retainer ring 16 relative to male element 12 and female element 14 permits full rotational movement of those two elements relative to one another.

Male element 12 generally includes a body 18 that extends from forward end 22 along longitudinal axis X—X (when coupling 10 is assembled) and transitions at a shoulder 21 that extends in a plane essentially perpendicular to axis X—X to a larger diameter interconnect member 19 which terminates in a rearward end 20. A groove 24 is formed circumferentially around body 18 in a plane essentially perpendicular to axis X—X and adjacent end 22, and a groove 26 is formed circumferentially around body 18 in a plane essentially perpendicular to axis X—X and positioned rearwardly of groove 24 along body 18. Forward end 22 includes a series of circumferentially spaced apart spokes 28 extending outwardly therefrom. Spokes 28 include a slight, outwardly directed taper with an essentially flat inwardly directed surface 30 that extends in a plane essentially perpendicular to axis X—X. Male element 12 may contain a groove 26 disposed rearwardly of spokes 28. An O-ring 46 with an external diameter greater than male element 12 may be positioned in secure engagement with groove 26 to further contact female element 14 when coupling 10 is assembled. O-ring 46 produces a seal within coupling 10 to prevent, or at least minimize, liquid from escaping between male element 12 and female element 14.

Female element 14 generally comprises a body 32 that extends along axis X—X (when coupling 10 is assembled) and includes an opening 34 extending longitudinally therethrough. Body 32 terminates in rearward end 36 and forward end 38, and includes a series of circumferentially spaced apart spokes 40 extending radially inwardly from an intermediate position along body 32. Spokes 40 include a slightly outwardly directed taper with an essentially flat, inwardly directed surface 42 that extends in a plane essentially perpendicular to axis X—X. For reasons detailed hereinafter, the width of spokes 40 is less than the width of the spacing formed between successive spokes 28.

Figure 2:
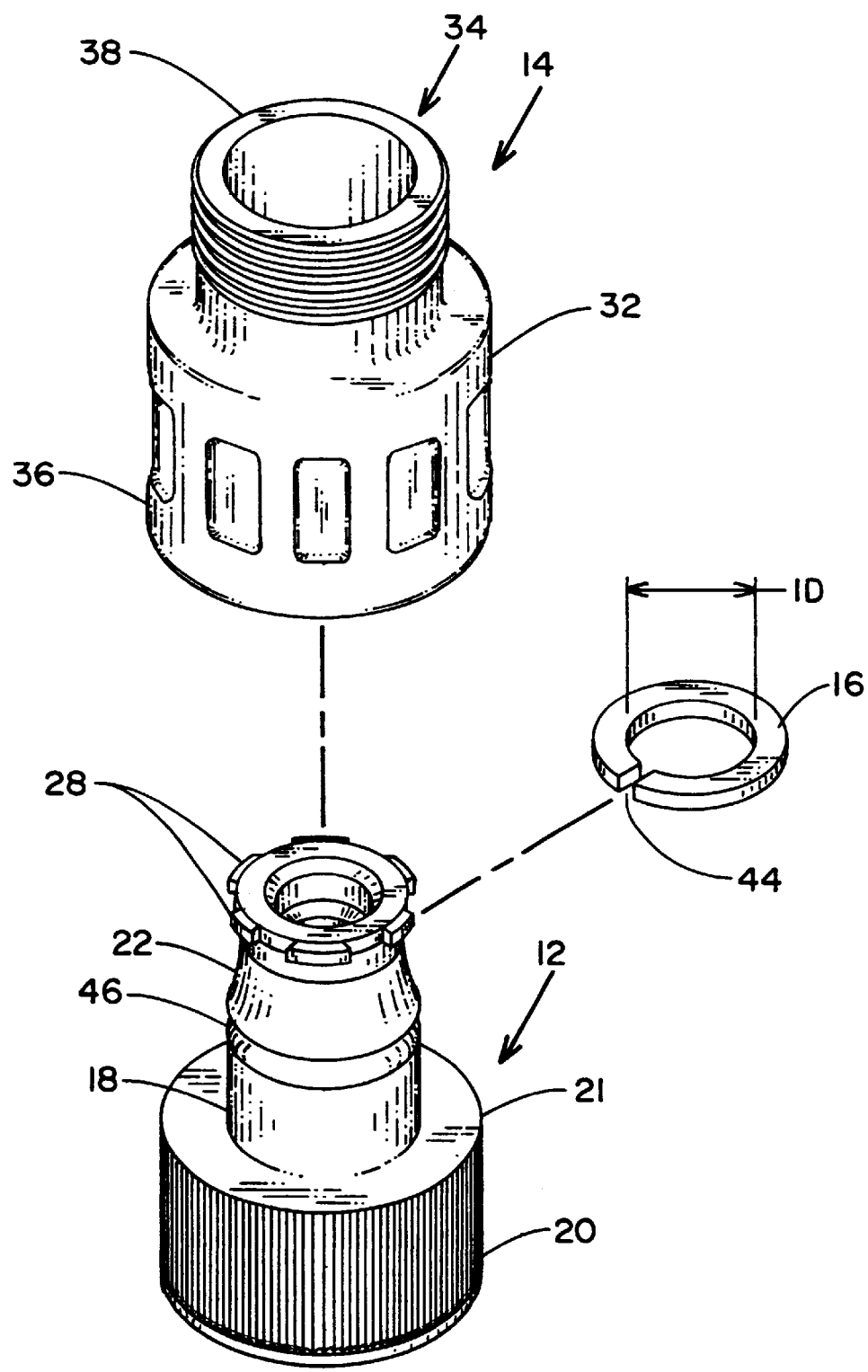
FIG. 2 is an exploded perspective view of the hose coupling of the present invention.
Figure 3:
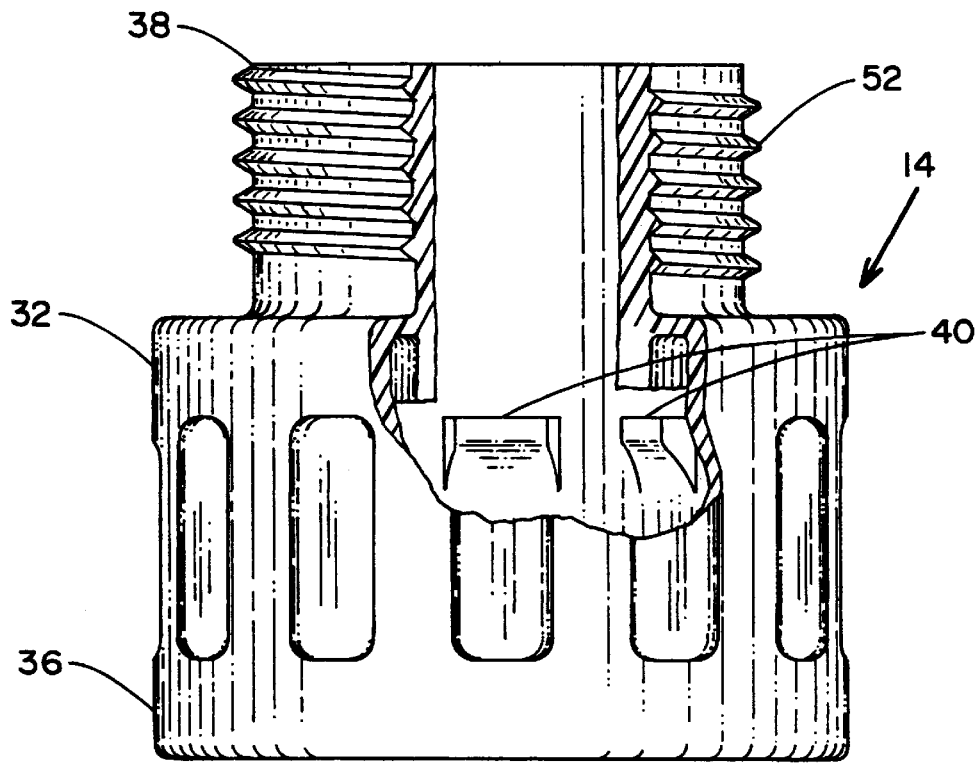
FIG. 3 is a side elevational view of the female member of the present invention.
Figure 4:
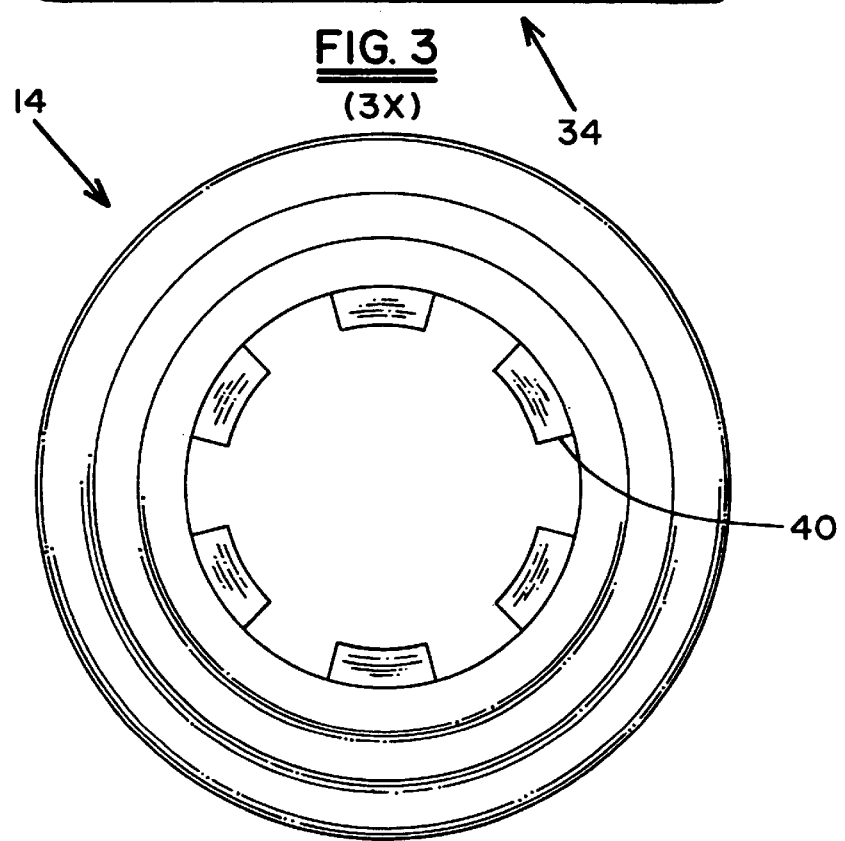
FIG. 4 is a front elevational view of the female member of the present invention.
Figure 5:
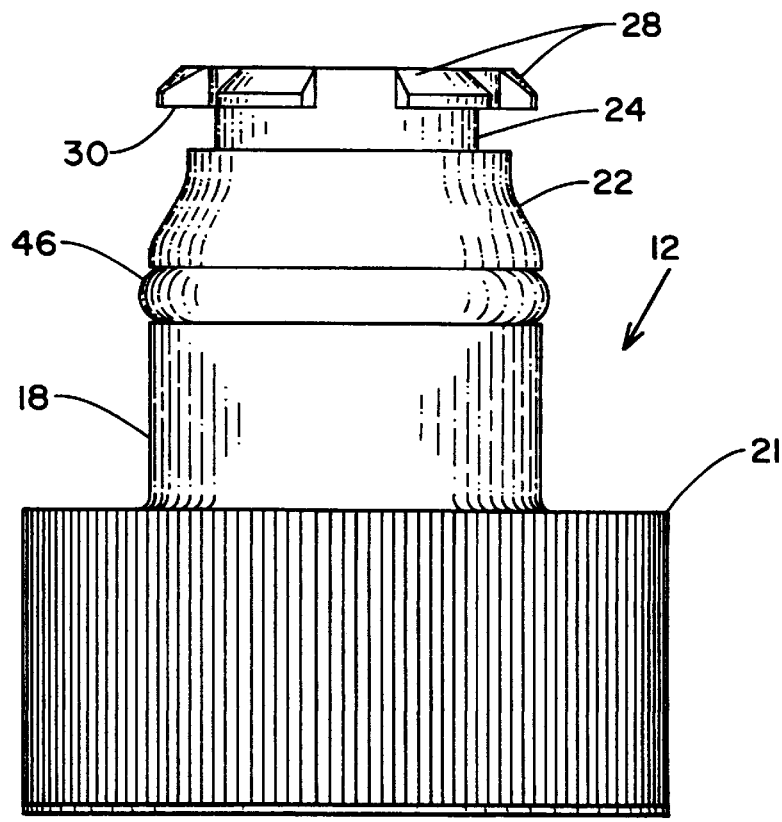
FIG. 5 is a side elevational view of the male member of the present invention.
Figure 6:
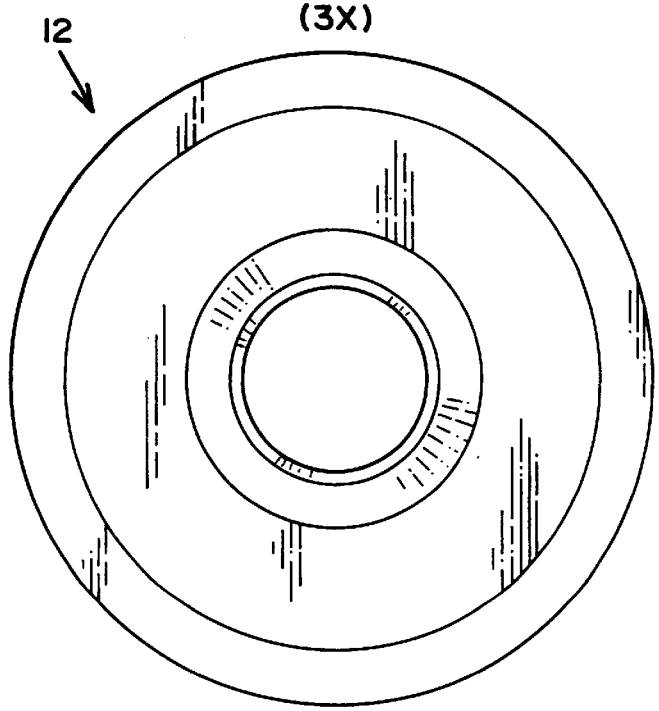
FIG. 6 is a front elevational view of the male member of the present invention.

To assemble hose coupling 10, retainer ring 16 is first slid over spokes 28 and into engaging relation with groove 24. Alternatively, retainer ring 16 may include a gap 44 formed therethrough (see FIG. 2) to facilitate it being snap engaged onto groove 24. In order to ensure secure engagement of retainer ring 16 on groove 24, its internal diameter (ID) is slightly less than (or no greater than) the cross-sectional diameter of body 18 at groove 24. To ensure relative movement of male element 12 to retainer ring 16, the width of retainer ring 16 is slightly less than the width of groove 24, thereby creating a gap 48 between retainer ring 16 and an end wall of groove 24.

To complete the assembly of coupling 10, forward end 22 of male element 12 is longitudinally inserted through rearward end 36 and into opening 34 with spokes 28 passing through the spaces formed between successive spokes 40. Spokes 40 contact retainer ring 16, compressing it sufficiently to allow passage. The oppositely directed tapers of spokes 28 and 40, coupled with the resilient quality of the material from which retainer ring 16 is composed (e.g., plastic), permits male member 12 to snap engage with female member 14 with retainer ring 16 flexing back to its original shape and size. An O-ring 54 may be (does not necessarily have to be) positioned in groove 24 to increase the resilient quality of retainer ring 16 during snap engaging and prevent undesirable compression of the retainer ring 16 during high fluid pressure.

Forward end 22 of male element 12 is positioned within female element 14 such that retainer ring 16 is sandwiched between surfaces 30 and 42, and O-ring 46 is sealingly compressed between groove 26 and the interior wall of female element 14. By maintaining separation between male element 12 and female element 14, coupled with the gap 48 created due to the width of retainer ring 16 being less than the width of groove 24, male element 12 may fully rotate (i.e., rotate a full 360 degrees) about longitudinal axis X—X relative to female element 14 (and vice-versa). In addition, due to the interference created between surfaces 30, 42 and retainer ring 16, and between shoulder 21 and rearward end 36, forces experienced through normal use of coupling 10 will not cause it to disassemble.

In use, rearward end 22 of male element 12 is connected to a first hose (not shown) or other cleaning implement (e.g., scrub brush, spray valve, or sprinkler) via its threads 50 or other conventional connector, and forward end 38 of female element 14 is connected to a second hose (not shown) or cleaning implement via its threads 52 or other conventional connector. Due to the rotational freedom of male element 12 relative to female element 14, first and second hoses or cleaning implements will not twist or kink, thus producing a more efficient and effective cleaning system.

What is claimed is:

1. A hose coupling, comprising:
   a female member having a through axial bore and a first plurality of inwardly extending spokes;
   a male member engaged with said female member and having a second plurality of outwardly extending spokes;
   a retainer ring disposed between said first plurality of spokes and said second plurality of spokes, wherein said retainer ring connector is disposed within an annular groove adjacent to said outwardly extending spokes; and
   an O-ring disposed in said annular groove beneath said retainer ring.

2. The hose coupling of claim 1, wherein said inwardly extending spokes are tapered to slide over said retainer ring of said male member during mating.

* * * * *